United States Patent [19]
Matsuo et al.

[11] Patent Number: 5,974,513
[45] Date of Patent: Oct. 26, 1999

[54] IC MEMORY CARD HAVING READ/WRITE INHIBIT CAPABILITIES

[75] Inventors: Yuzou Matsuo; Kyougo Suzuki, both of Ibaraki-ken, Japan

[73] Assignee: Hitachi Maxell, Ltd., Osaka, Japan

[21] Appl. No.: 08/332,035

[22] Filed: Nov. 1, 1994

[30] Foreign Application Priority Data

Nov. 4, 1993 [JP] Japan .................................. 5-299034

[51] Int. Cl.⁶ ................................................. G06F 12/14
[52] U.S. Cl. ........................................... 711/164; 711/115
[58] Field of Search .................................. 395/491, 490, 395/442; 711/163, 164, 115

[56] References Cited

U.S. PATENT DOCUMENTS

| | | | |
|---|---|---|---|
| 3,971,916 | 7/1976 | Moreno | 711/164 |
| 4,882,474 | 11/1989 | Anderl et al. | 235/380 |
| 5,436,621 | 7/1995 | Macko et al. | 340/825.44 |
| 5,519,270 | 5/1996 | Yamada et al. | 310/67 R |

OTHER PUBLICATIONS

"IC Memory Card Guidelines" Ver 4.1.

*Primary Examiner*—Eddie P. Chan
*Assistant Examiner*—Kevin L. Ellis

[57] ABSTRACT

A semiconductor storage device having a semiconductor memory for storing various data, a connector portion for uniting with a reader-writer device, and a memory control portion for controlling reading of data from the semiconductor memory and writing of data into the semiconductor memory in accordance with an instruction from the reader-writer device inputted through the connector portion. The semiconductor memory has a set password storage region where a set password has been written. The device is provided with a set password address comparison portion for outputting a coincidence signal to the memory control portion when an address signal inputted from the connector portion points to the set password storage region and a password collation portion for outputting a coincidence signal to the memory control portion when the set password outputted from the memory control portion and the input password inputted from the connector portion coincide with each other. When the coincidence signal from the set password address comparison portion is received, the memory control portion reads a set password out of the set password storage region of the semiconductor memory and outputs the set password to the password collation region, and inhibits access to the semiconductor memory until receiving a coincidence signal from the password collation portion.

8 Claims, 12 Drawing Sheets

IC MEMORY CARD HAVING READ/WRITE INHIBIT CAPABILITIES

BACKGROUND OF THE INVENTION

The present invention relates to a semiconductor storage device used as an auxiliary storage device of a computer or the like, and more particularly to means for inhibiting read/write of a semiconductor memory using a password.

DESCRIPTION OF THE BACKGROUND ART

An IC card loaded with a semiconductor storage cell is used as an auxiliary storage device of a computer or the like. Such an IC card includes a memory card loaded with a CPU and that which is a semiconductor storage device loaded with a memory element only.

Although a memory card has a merit that it is compact in size and has a large storage capacity, there has been a problem in point of keeping the contents secret because anyone can read out data in the memory card, and further, there has been a fear that the data once written can be erased by mistake or superscribed because anyone can write data therein.

On the other hand, the IC card contains a microprocessor and a semiconductor memory the card in itself, and stores a password in advance so as to make it possible to write or read the data in and out of the IC card only when the password coincides with the data inputted from the outside.

Thereupon, it is possible to load a microprocessor on a memory card so as to have collation of the password made in order to solve the problem in the memory card mentioned above. Since the microprocessor collates only the password in this case, however, the microprocessor is not used effectively, and cost performance is very low. Further, it is generally required that the memory card be as compact as possible and have a large storage capacity. Therefore, when a microprocessor is loaded in the memory card, the loading space of the semiconductor memory is reduced as a matter of course, which is disadvantageous in achieving a compact size and a large capacity. Moreover, when a microprocessor is loaded, a semiconductor memory for storing a program or the like for operating the microprocessor also becomes necessary, thus causing further disadvantage.

SUMMARY OF THE INVENTION

The present invention has been made in view of the drawbacks as described above, and it is a first object thereof to provide a function of data protection, similarly to an IC card having a microcomputer inside, in what is called a memory card having no microcomputer.

Further, it is a second object of the present invention to provide a semiconductor storage device capable of writing and reading to and from a semiconductor memory using a password only by adding a simple circuit.

In order to achieve the above-mentioned objects, the present invention provides a semiconductor storage device composed of a semiconductor memory for storing various data, a connector portion for uniting with a reader-writer device, and a memory control portion for controlling writing into the semiconductor memory in accordance with instructions from the reader-writer device inputted through the connector portion, wherein there are provided an enabling mode for enabling read-write of data out of and into the semiconductor memory and an inhibit mode for inhibiting read-write of data out of and into the semiconductor memory for the reader-writer device. A flag is stored in the semiconductor memory, and the memory control portion is always in the inhibit mode when electric power is supplied from the outside and shifts to the enabling mode when an instruction to read the flag is inputted from the reader-writer device through the connector portion and the flag shows a predetermined value.

In order to achieve the above-mentioned object, the present invention has the essential points that, in a semiconductor storage device composed of a semiconductor memory for storing various data, a connector portion for uniting with a reader-writer device, and a memory control portion for controlling read-out of the data in the semiconductor memory and writing of data into the semiconductor memory in accordance with indications from the reader-writer device inputted through the connector portion, the semiconductor memory has a set password storage region where a set password has been written, and further has a set password address comparison portion for outputting a specific signal to the memory control portion when an address signal inputted from the connector portion points to the set password storage region and a password collation portion for outputting a specific signal to the memory control portion when a set password outputted from the memory control portion and an input password inputted from the connector portion coincide with each other, and the memory control portion reads a set password out of the set password storage region of the semiconductor memory and outputs it to the password collation portion when a specific signal from a set password address comparison circuit is received, and inhibits access to the semiconductor memory until a specific signal from the password collation circuit is received.

According to such a structure, when a power supply is applied in a state that the semiconductor storage device is connected to the reader-writer device, the memory control portion inhibits access to the semiconductor memory. When the address and the input password of the set password storage region are inputted from the reader-writer device, the memory control portion reads the set password out of the semiconductor memory based on a coincidence signal from the set password address comparison portion and outputs the set password to the password collation portion. When coincidence with the input password is determined in the password collation portion, the memory control portion releases inhibition of access to the semiconductor memory based on a coincidence signal from the password collation portion.

DESCRIPTION OF THE PREFERRED EMBODIMENTS

Figure 1:
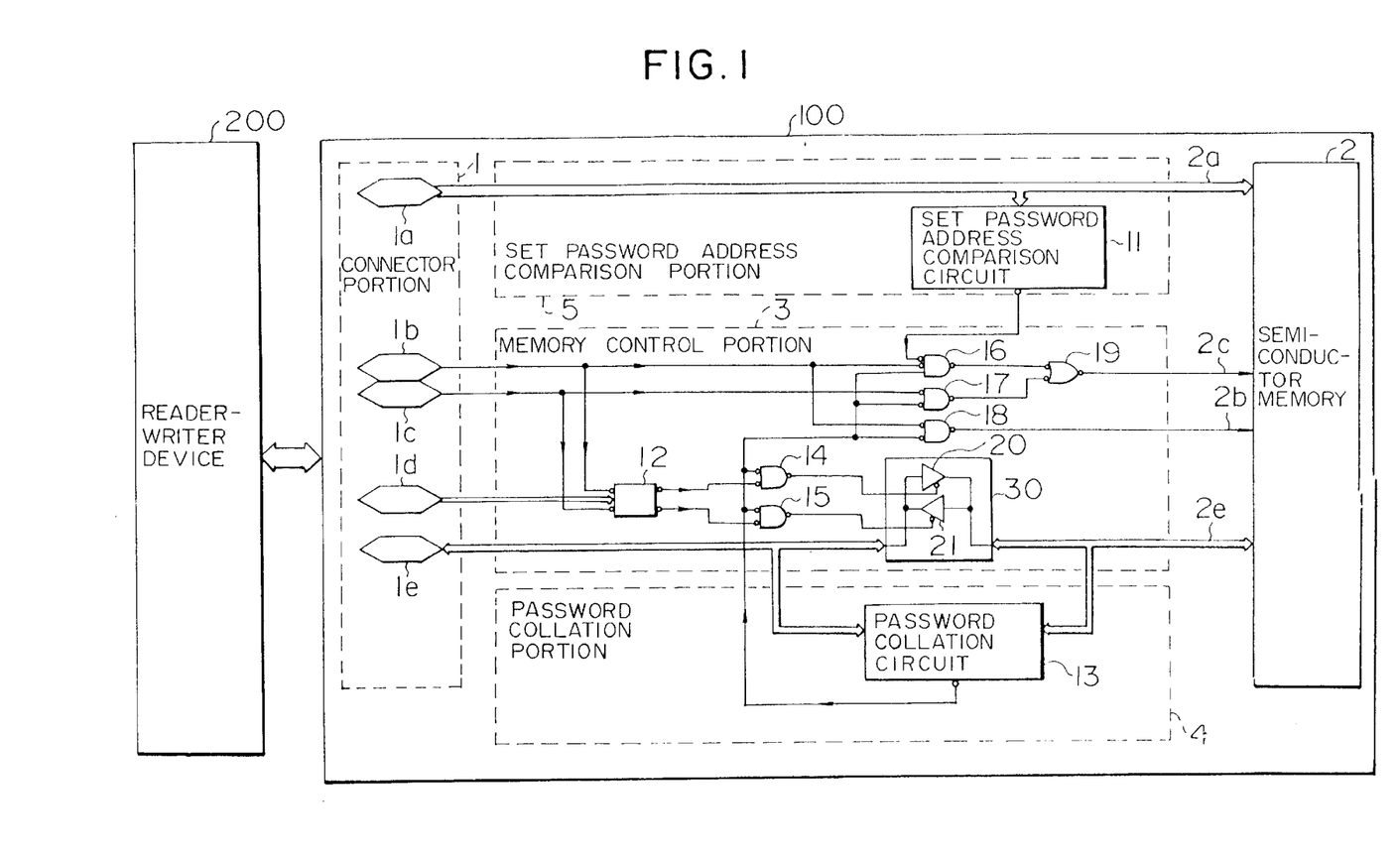
FIG. 1 is a block diagram showing a first embodiment of a memory card according to the present invention.

Embodiments of the present invention will be described hereinafter with reference to the drawings. FIG. 1 is a circuit diagram showing a first embodiment of a memory card 100. In this figure, a part of circuits are shown with blocks, and a power supply, ground or the like are omitted for making it readily understandable. In FIG. 1, a reference numeral 1 represents a connector portion, 2 a semiconductor memory, 3 a memory control portion, 4 a password collation portion, and 5 a set password address comparison portion.

The connector portion 1 is for uniting the memory card 100 with a reader-writer device 200, and is composed of a terminal 1a for receiving an address signal from the outside, a terminal 1e for exchanging a data signal, a terminal 1b for receiving a write control signal, a terminal 1c for receiving a read control signal, a terminal 1d for receiving a control signal other than for write-read and so on. Besides, when the present invention is applied to a non-contact memory card, these terminals are composed of coils or light transmitting-receiving devices, etc.

Figure 4:
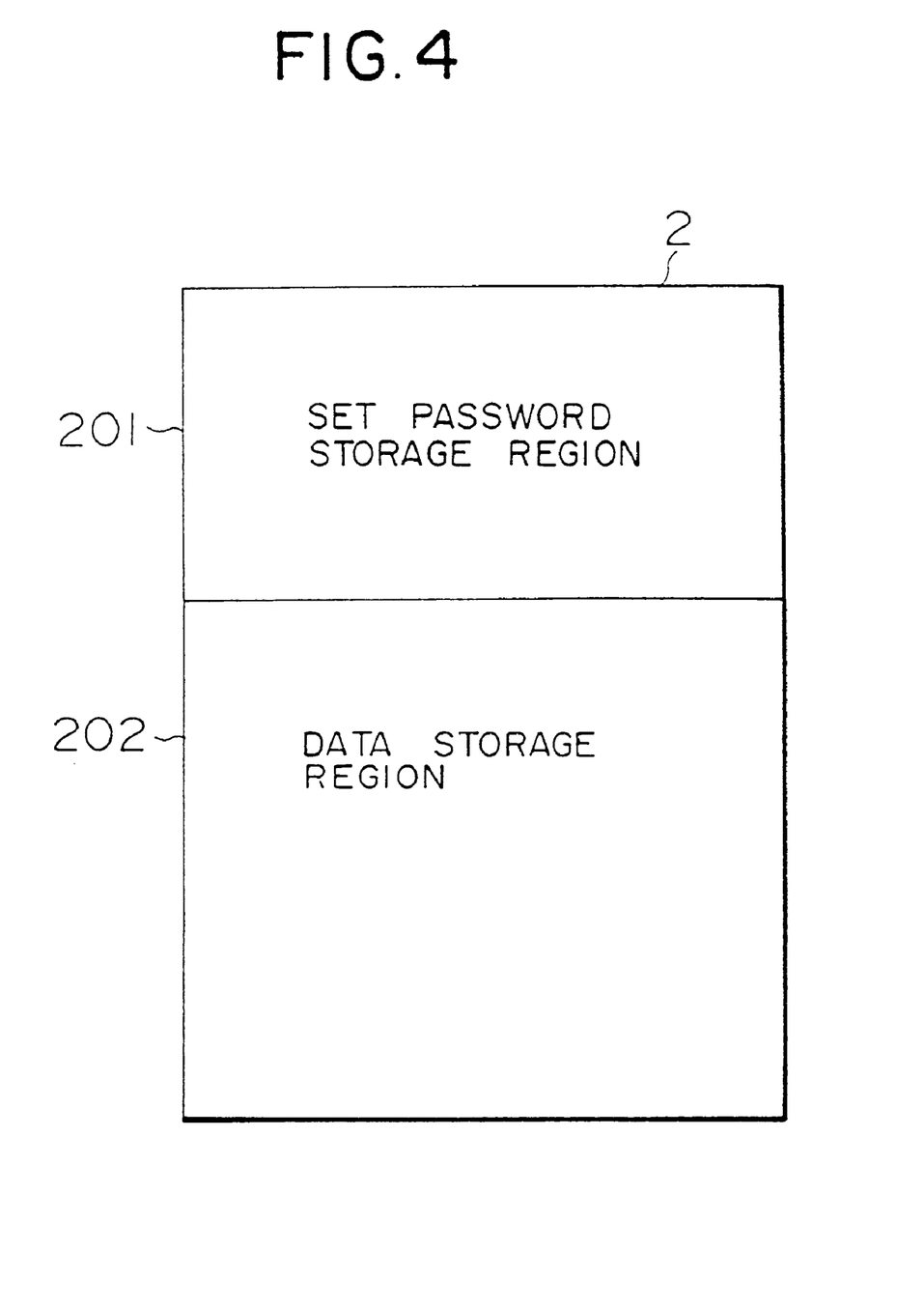
FIG. 4 is a memory block diagram of a semiconductor memory of a memory card.

The semiconductor memory 2 may be either volatile or nonvolatile, and further, 2a is a terminal for receiving an address signal, 2e is a terminal for exchanging a data signal, 2c is a terminal for receiving a read control signal (it is assumed that a read command is a Low signal in the present description), and 2b is a terminal for receiving a write control signal (it is assumed that a write command is a Low signal in the present description). The semiconductor memory 2 is composed of a set password storage region 201 for writing set passwords and a data storage region 202 for storing data as shown in FIG. 4, and set passwords are written in advance in the set password storage region 201.

The memory control portion 3 is composed of an input-output control circuit 12 for receiving control signals for writing, reading or the like from the outside so as to control the input-output of the data signals and gates 14 to 21.

The set password address comparison portion 5 is composed of a set password address comparison circuit 11 for comparing an address inputted from the outside with an address of the set password storage region 201 in the semiconductor memory 2, outputting a Low signal when they coincide with each other and a High signal when they do not coincide with each other.

Figure 2:
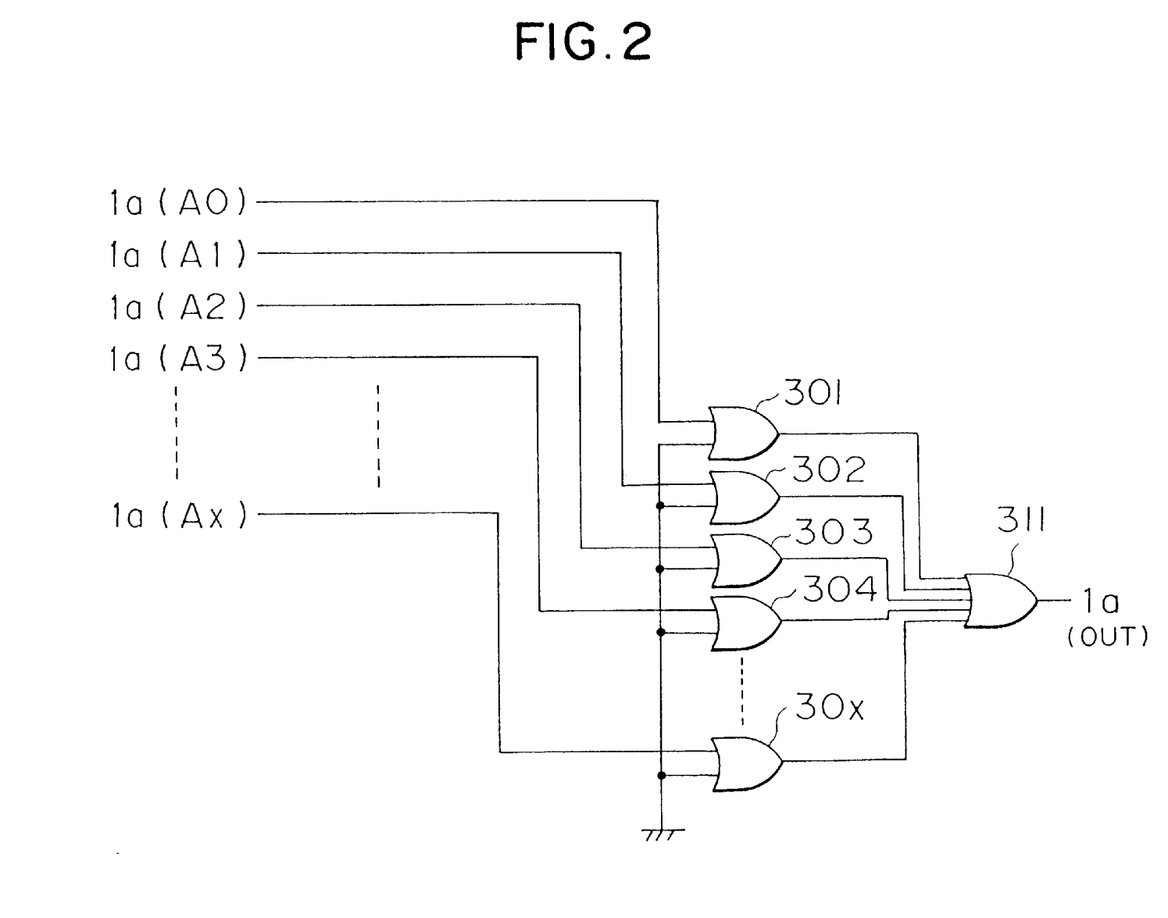
FIG. 2 is a circuit diagram showing an embodiment of a set password address comparison circuit.

An embodiment of the set password address comparison circuit 11 is shown in FIG. 2. The address comparison circuit 11, is a bus of which constituent elements are 1a(A0), 1a(A1) to 1a(AX). These elements 1a(A0), 1a(A1) to 1a(AX) are respectively inputted into OR gates 301 to gate 30x. Further, in this figure, it is assumed that the set password address is an address '00(H)' and the inputs on one side of the OR gate 301 to the OR gate 30x are GND. It is a matter of course that it is sufficient to change the inputs of these gates in accordance with the set password address when the set password address is other than the address '00(H)' and to use different types of logic gates as would be understood by one of ordinary skill. The output of a gate 311 becomes the output of the password address comparison circuit 11.

The password collation portion 4 is composed of a password collation circuit 13 for comparing an input password inputted through a data signal from the outside with a set password outputted from the semiconductor memory 2, and outputting a Low signal thereafter when they coincide with each other and a High signal when they do not coincide with each other.

Figure 3A:
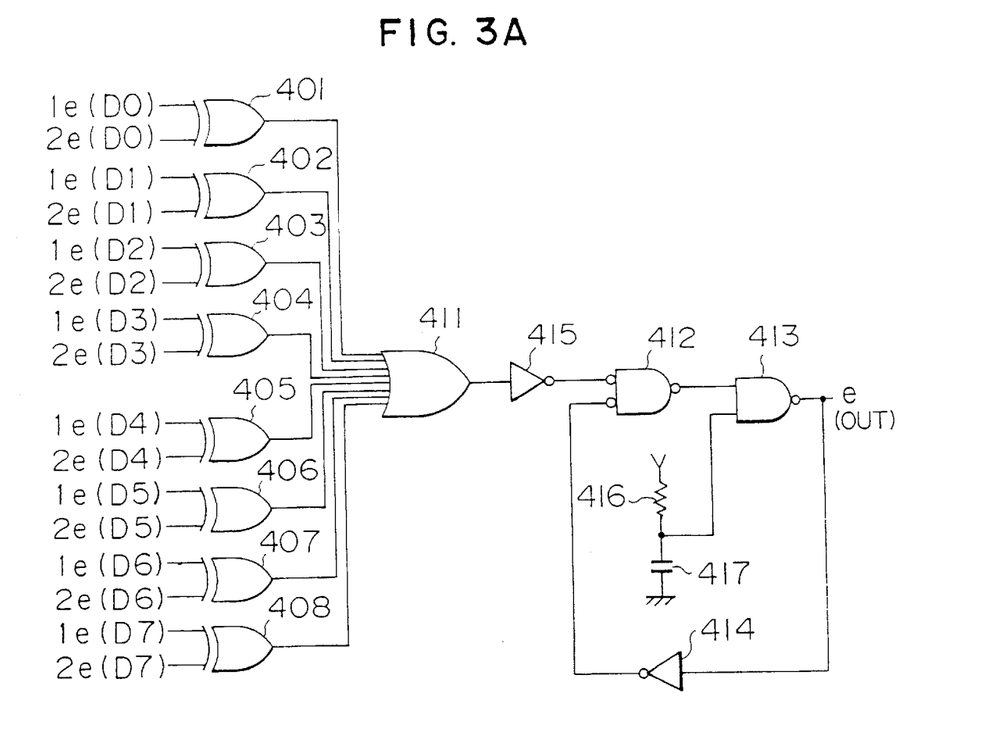
FIGS. 3A and 3B are circuit diagrams showing an embodiment of a password collation circuit.
Figure 3B:
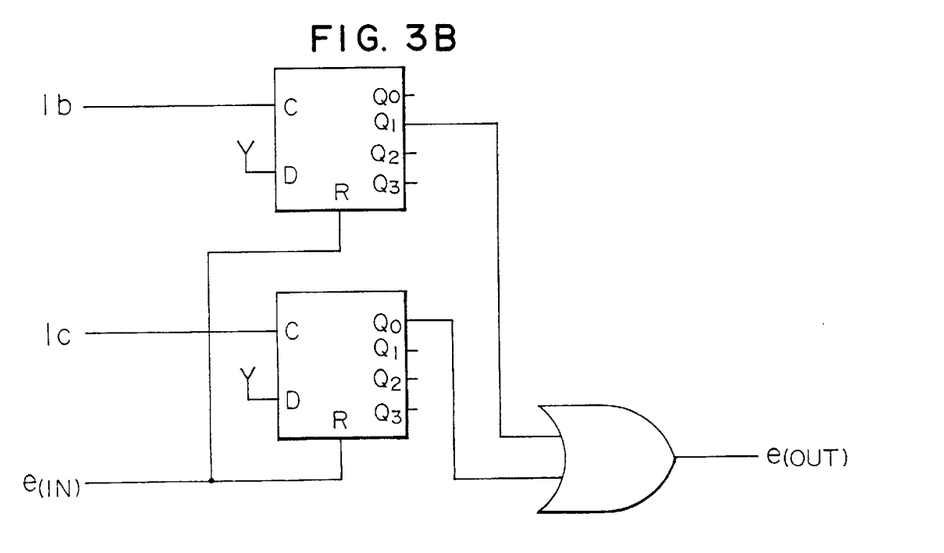

An embodiment of the password collation circuit 13 is shown in FIG. 3A. 1e(D0) to 1e(D7) are respective data signals constituting data signals 1e from the connector portion 1 of the password collation circuit 13, and 2e(D0) to 2e(D7) are respective data signals constituting the data signals 2e from the semiconductor memory 2. The data are collated by using these signals as the inputs of a gate 401 to a gate 408, and the outputs of these gates are used as the inputs of a gate 411.

A circuit composed of a gate 412 to a gate 415, a capacitor 417 and a resistance 416 maintains a signal of the gate 411 that is a result of collation of a password until time of electric power interruption, i.e., extraction of the memory card. An end of the resistance 416 is connected to a power supply terminal receiving electric power from the reader-writer device of the connector portion 1 not illustrated, and an end of the capacitor 417 is connected to ground.

The capacitor 417 and the resistance 416 act to output temporarily a Low signal to the gate 413 when the reader-writer of the memory card is installed, and to output a High signal thereafter. With the structure described above, when the memory card is connected to the reader-writer device and electric power is supplied, the password collation circuit 13 outputs a High signal, and continues to output a Low signal when passwords coincide with each other, and continues to output a High signal in case of non-coincidence.

Although the width of the data is assumed to be 8 bits in this circuit, it is a matter of course that 16 bits, 36 bits and so on can be realized simply by increasing the number of the gates 401 to 408. Further, when the set password is formed of a plurality of words, they may be realized by combining the circuit shown in FIG. 3A.

The concrete operation of the circuit will be described with reference to FIG. 1. After the power supply is applied, High signals are outputted from the password collation circuit 13 and the set password address comparison circuit 11, and these signals are inputted to a gate 16, a gate 17 and a gate 18. The gate 16, the gate 17 and the gate 18 output High signals irrespective of inputs on the other sides. A gate 19 receives input of High signals from the gate 16 and the gate 17 and outputs a High signal. As a result, the outputs of High signals from the gate 19 and the gate 18 are transmitted to a read control signal 2c and a write control signal 2b of the semiconductor memory 2, thus bringing the semiconductor memory 2 into an inhibit state both for write and read. In this circuit, write and read-out are inhibited over the whole region of the semiconductor memory 2 for the sake of simplifying the description, but it is a matter of course that it is possible to inhibit only a part of the region of the semiconductor memory 2 by altering a part of the circuit or to inhibit either one of write and read-out, such as by dividing the semiconductor memory 2 into blocks.

Next, a method of password collation for releasing the inhibit state will be described. First, an operation of writing an input password into the set password storage region 201 located in the semiconductor memory 2 from the outside through a reader-writer device will be described 200. In other words, in the connector portion 1, an address of the set password storage region 201 located in the semiconductor memory 2 is inputted to the address signal terminal 1a, an input password is inputted to the data signal terminal 1e, and a Low signal is inputted to the write control signal terminal 1b. At this point of time, however, since a High signal is inputted to the write control signal terminal 2b of the semiconductor memory 2 as described previously, the contents of the semiconductor memory 2 will never be reloaded. The address inputted to the address signal terminal 1a is transmitted to the set password address comparison circuit 11, and a Low signal is outputted from the set password address comparison circuit 11 when the input address and the address of the set password storage region 201 coincide with each other. This Low signal is transmitted to the input of the gate 16. Since a Low signal from the write control signal terminal 1b and a High signal from the password collation circuit 13 are inputted to the other input of the gate 16, the output of the gate 16 becomes a Low signal. This Low signal is transmitted to the gate 19, and thus the output of the gate 19 becomes a Low signal. The output of this Low signal is transmitted to the read control signal terminal 2c of the semiconductor memory 2, and the semiconductor memory 2 is brought into a read-out state and a set password is outputted from the terminal 2e of the semiconductor memory 2. In a word, a write control signal from the outside is converted into a read control signal in the memory control portion 3, and is transmitted to the semiconductor memory 2.

Besides, a noteworthy point here is that no collision of data occurs on a data signal. Since the output of the password collation circuit 13 is a High signal, this high signal is transmitted to the inputs of the gate 14 and the gate 15, the outputs of these two gates both become High signals and these High signals are inputted to high impedance control terminals of gates 20 and 21 of a data input-output control portion 30. With this, the data signal lines 1e and 2e are brought into an electrically disconnected state by means of the gate 20 and the gate 21. As a result, a set password outputted from the semiconductor memory 2 and an input password inputted from the connector portion 1 never come across each other on the data signal line. This set password and the input password are collated with each other by means of the password collation circuit 13, and a Low signal is continued to be outputted from the password collation circuit 13 thereafter when the result of collation shows coincidence. The output of this Low signal is inputted to the gate 14, the gate 15, the gate 16, the gate 17 and the gate 18, thereby to release the inhibit state of write and readout of the semiconductor memory 2.

Figure 5:
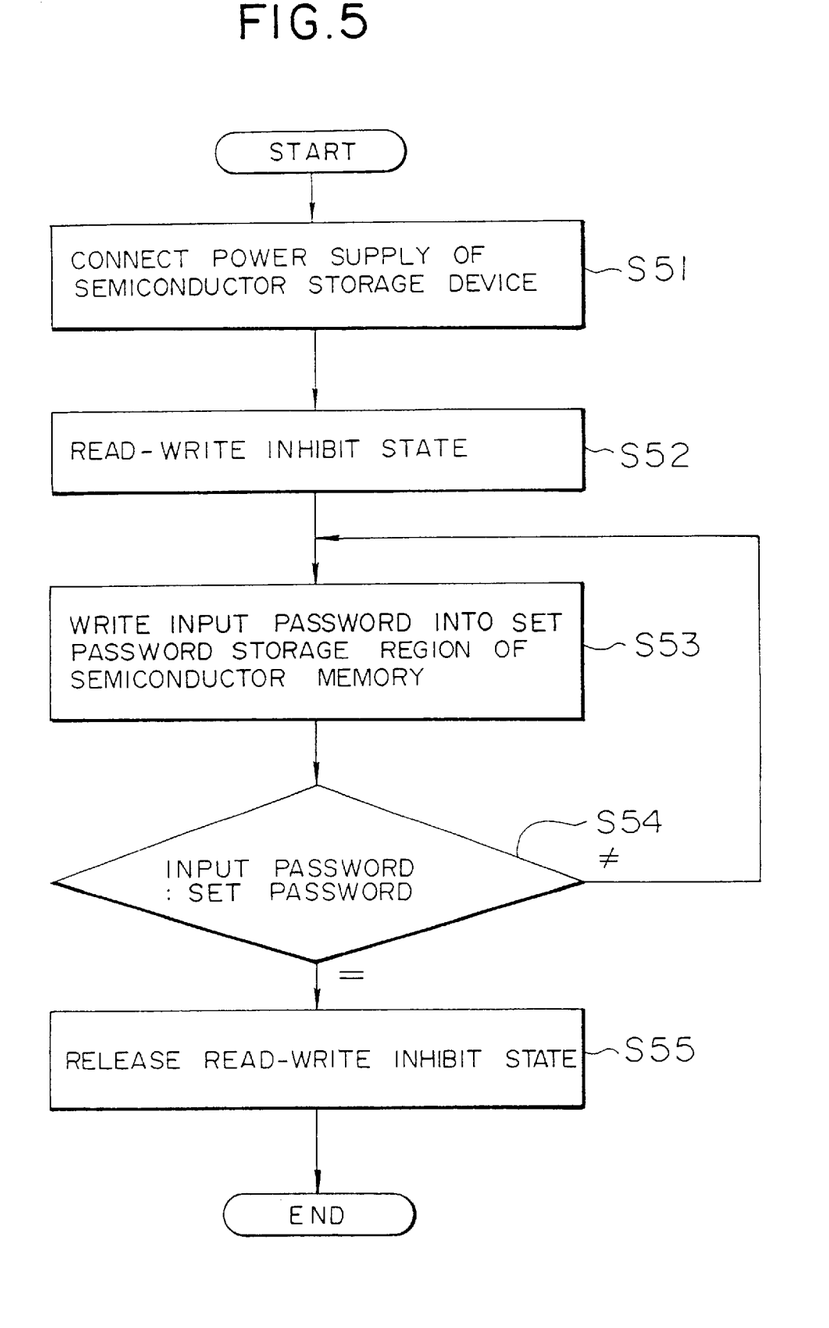
FIG. 5 is a flow chart showing a processing procedure of a memory card.

The operation of releasing the read-write inhibit state by the password collation described above can be expressed as the flow chart shown in FIG. 5.

In a part of or the whole region of the semiconductor memory 2 in the memory card 100, after the power supply is connected (S51), both or either one of write and read-out is in an inhibit state (S52). In order to release this inhibit state, an operation of writing an input password in the set password storage region of the semiconductor memory 2 is performed (S53). By performing such an operation, the memory control portion 3 and the password collation portion 4 collate the input password with the set password (S54), and release the inhibit state when they coincide with each other (S55), but the read-write inhibit state is continued in case of non-coincidence. After released once, this state is continued until the power supply is cut off. In this case, when the power supply is applied again after the power supply is cut off, the state is returned to the initial state, thus producing a read-write inhibit state of the semiconductor memory 2.

While in the above embodiment, though the read write inhibit state is to be continued until the power supply is disconnected, after the input password is determined to once coincide with the set password, however, the collation of the password can be operated at each read write operation. In this case, the password collation circuit is structured by connecting output terminal e(out) in FIG. 3A to terminal e(in) of a circuit composed of a 4 bit shift register. By this structure, security of data is further improved.

Besides, since all of the storage regions of the semiconductor memory 2 become writable and readable when the inhibit state is released as described previously, the set password is altered by designating the address in the set password storage region of the semiconductor memory 2 and rewriting the contents thereof.

Figure 6:
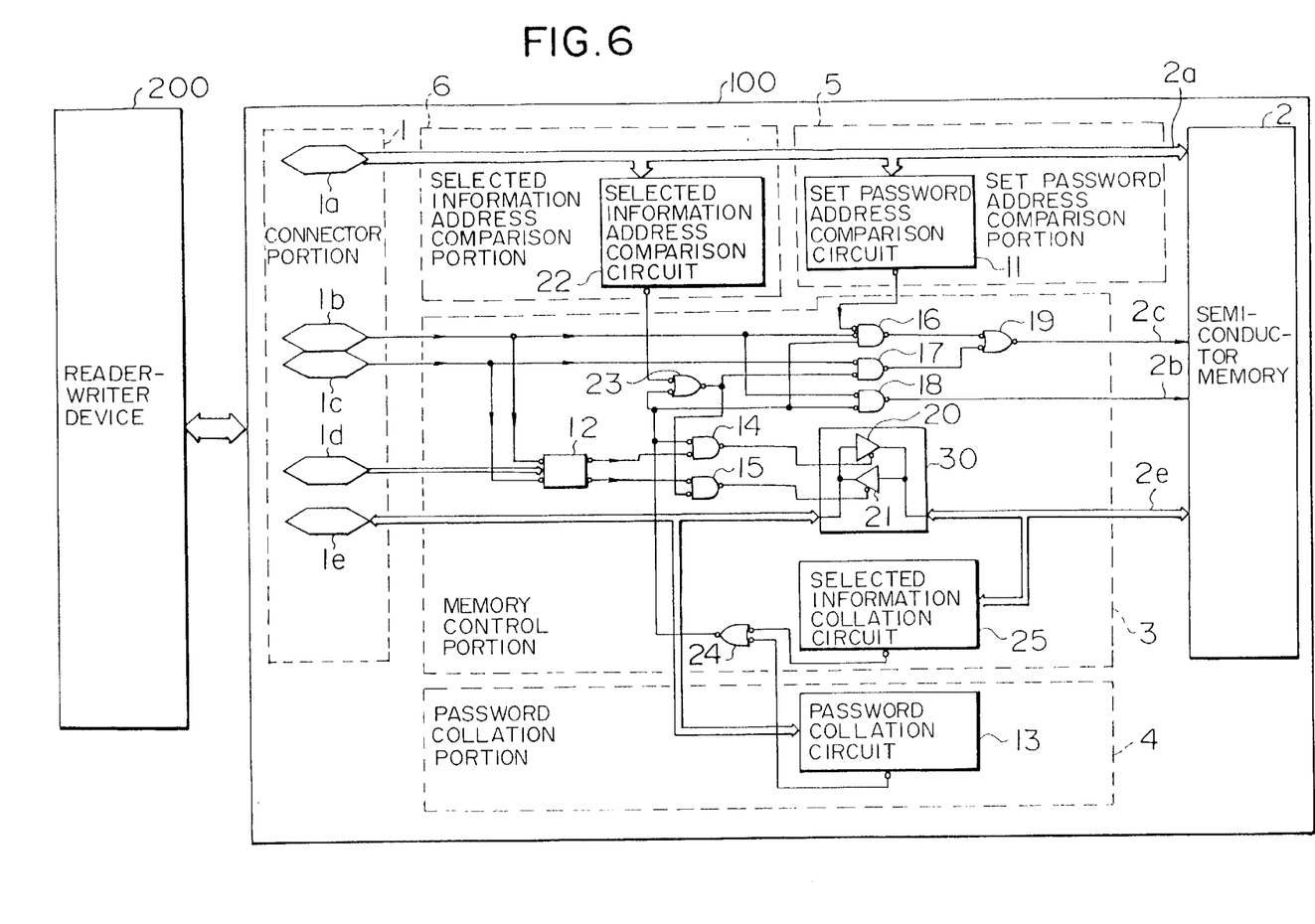
FIG. 6 is a block diagram showing a second embodiment of a memory card.

Next, a second embodiment will be described based on FIG. 6. In FIG. 6, components same as those shown in FIG. 1 are indicated with the same reference numerals. In the first embodiment, the write and readout inhibit state of the semiconductor memory 2 is not released after the power supply is connected unless the collating operation of the password is performed without fail. This point is improved in the present embodiment.

Figure 7:
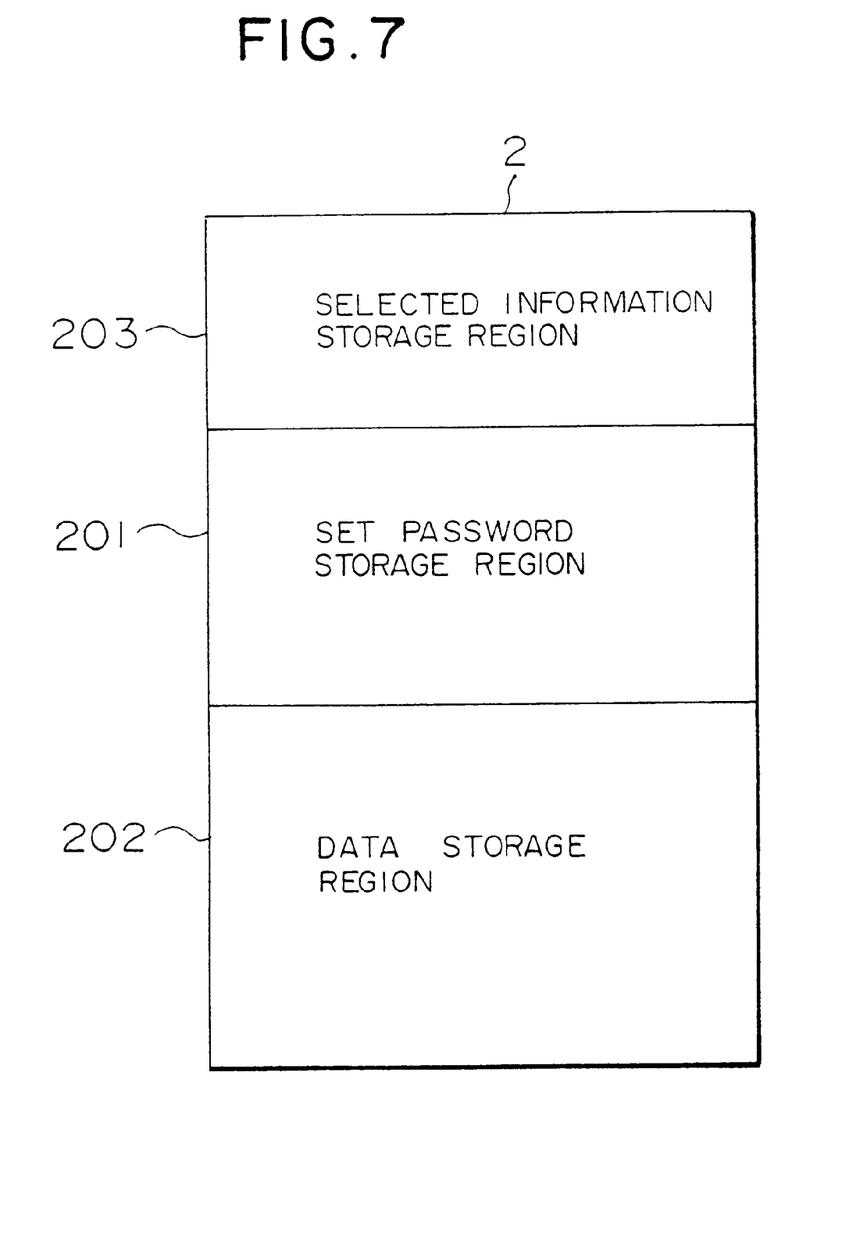
FIG. 7 is a memory block diagram of a semiconductor memory of the memory card.

As shown in FIG. 7, the semiconductor memory 2 has a selected information storage region 203 for selecting two modes. In a password collation mode both or either one of inhibit states of write and read-out of a part of or the whole regions of the semiconductor memory 2 is released depending on the result of collation by the password collation circuit 13. In a standard mode, from the beginning both write and read-out of the whole region of the semiconductor memory 2 is released without depending on the result of collation described above.

Further, as to the circuit, there is provided a selected information address comparison portion 6 composed of a selected information address comparison circuit 22 for comparing an address inputted from the outside with an address in the selected information storage region 203 in the semiconductor memory and outputting a Low signal when they coincide with each other, and the memory control portion 3 includes, when the contents of selected information read out of the semiconductor memory 2 are to release both write and read-out of the semiconductor memory 2 from the beginning without depending on the result of collation by the password collation circuit 13, a selected information collation circuit 25 for outputting a Low signal thereafter, a gate 23 and a gate 24.

Besides, the selected information address comparison portion 6 can be realized with a circuit configuration almost the same as that of the set password address comparison circuit 11, and description thereof is omitted. Further, the selected information collation circuit 25 can also be realized with a circuit configuration almost the same as that of the set password address comparison circuit 11 by only making the gate input with the data signal terminal 2e when '0(H)' is in a standard mode.

When the power supply is connected, High signals are outputted from the password collation circuit 13 and the set password comparison circuit 11, and these signals are inputted to a gate 16, a gate 17 and a gate 18. The gate 16, the gate 17 and the gate 18 output High signals irrespective of the inputs on the other sides. A gate 19 receives the High signals from the gate 16 and the gate 17 and outputs a High signal. As a result, the outputs of High signals from the gate 19 and the gate 18 are transmitted to a read control signal terminal 2a and a write control signal terminal 2b of the semiconductor memory 2, and the semiconductor memory 2 is brought into an inhibit state both for write and read. Next, a reader-writer device 200 performs an operation of designating an address in the selected information storage region located in the semiconductor memory 2 and reading out the contents thereof. Even in the inhibit state, reading of the selected information storage region 203 located in the semiconductor memory 2 is possible since the selected information address comparison circuit 22 outputs a Low signal.

To be concrete, an address of the selected information storage region 203 is inputted to the address signal input terminal 1a, and a Low signal is inputted to the read control signal input terminal 1c by the connector portion 1, and the contents of the selected information storage region 203 are read through the data signal input-output terminal 1e.

The address of the selected information storage region 203 inputted to the address signal input terminal 1a is transmitted to the selected information address comparison circuit 22, and a Low signal is outputted in case of coincidence. A gate 23 that has received this Low signal outputs a Low signal irrespective of the input from the password collation circuit 13. The output of the gate 17 that has received the output of this Low signal and the Low signal from the read control signal becomes a Low signal, which is transmitted as a Low signal to the read control signal terminal 2c of the semiconductor memory 2 through the gate 19. Further, the output of the gate 15 that has received the output of a Low signal of the gate 23 and the output of a Low signal from the input-output control circuit 12 become a Low signal, which is inputted to a high impedance control terminal of a gate 21. With this, the data signal is directed in an output direction. Thus, the contents of the selected information storage region located in the semiconductor memory 2 are outputted to the reader-writer device 200 through the connector portion 1.

Further, the contents of the selected information storage region are transmitted to the selected information collation circuit 25 at the same time, and when the contents of this selected information storage region indicates the standard mode, the selected information collation circuit 25 outputs a Low signal. The output of this Low signal is transmitted to the gate 24 so as to set the output of the gate 24 to a Low signal and the inputs of the gate 14, the gate 16, the gate 17, the gate 18, the gate 23 and the gate 15 at latter stages thereof to a Low signal. With this, the input level of the write control signal terminal 1b and the read control signal terminal 1c inputted from the connector portion 1 is transmitted as it is to the write control signal terminal 2b and the read control signal terminal 2c of the semiconductor memory 2, and the write and read-out inhibit state of the semiconductor memory 2 is released.

Further, when the contents of this selected information storage region indicate the password collation mode, the output of this selected information collation circuit 25 becomes a High signal, and the inhibit state is released depending on the result of collation by the password collation circuit 13.

The operation described above can be shown as a flow chart in FIG. 8. After the power supply is connected (S81), in a part of or the whole region of the semiconductor memory 2 of the memory card 100, both or either one of write and read-out is in an inhibit state (S82).

Figure 8:
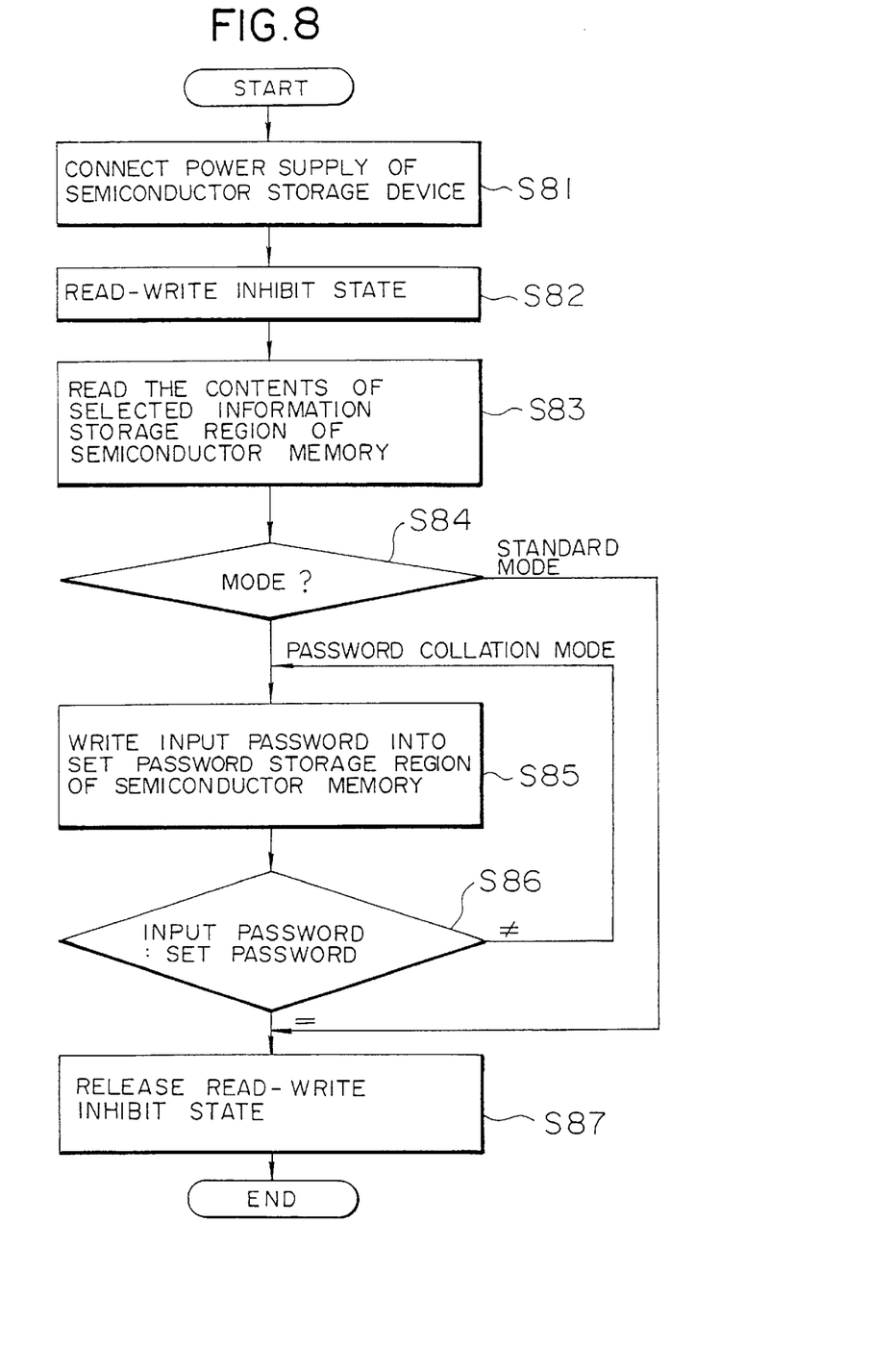
FIG. 8 is a flow chart showing a processing procedure of the memory card.

Next, when the contents of the selected information storage region located in the semiconductor memory 2 are read out (S83) and the contents indicate the standard mode, the collating operation of the password is skipped and the read-write inhibit state is released immediately (S87). When the contents indicate the password collation mode (S84) the same operation as that in FIG. 5 is performed (S85 to S87).

In the standard specification of a memory card that is a type of a semiconductor storage device published by Japanese Electronic Industry Development Association (such as IC Memory Card Guideline Ver. 4.1), an address '0(H)' that is a head address of an attribute memory in which attribute information or the like of the memory card is stored is to be read first after the power supply is connected. Further, it is prescribed that this address '0(H)' is any of data '01(H)' that are double ID of device information, data '00(H)' that are invalid double ID and data 'FF(H)' that are double chaining end double ID. When the data at the address '0(H)' are data '00(H)' that are invalid double ID, the data at the address '01(H)' that is the next address are read out, and these data have also to be of any of the three types described previously.

Therefore, the address '0(H)' is always read out first in a system using this memory card. Accordingly, when the selected information storage region 203 is arranged at the address '0(H)' that is the top address of the semiconductor memory 2 as shown in FIG. 7, it is possible to read the address '0(H)' first and transmit the contents of the selected information storage region to the selected information collation circuit 25 even without altering software of the reader-writer device 200 in particular. The same effects are also obtainable when the data '00(H)' that are invalid double ID are written at the address '0(H)' and the selected information is written at the address '01(H)'.

Further, when the contents of the selected information storage region are to mean that both or either one of writing and reading of a part of or the whole region of the semiconductor memory is released from the beginning without depending on the result of collation of the password collation circuit 13 at time of the data '01(H)', the system that has read the selected information storage region recognizes this memory card as a standard memory card, and moreover, the inhibit state can be released at the same time by this operation.

Accordingly, there is such a merit that one reader-writer device can be used both for the memory card of the present invention and the memory card of the standard specification described above without altering the software.

In this case, it is a matter of course to mean that, when the selected information data are other than the data '01(H)', the inhibit state of writing and reading of the semiconductor memory is released depending on the result of collation by the password collation circuit 13. Similarly, when the data '00(H)' or the data 'FF(H)' are made to mean to release writing and reading of the whole region of the semiconductor memory 2 from the beginning without depending on the result of collation by the password collation circuit 13, and to mean, when the data are other than the data '00(H)' or other than the data 'FF(H)', to release the inhibit state of writing and reading of the semiconductor memory in accordance with the result of collation by the password collation circuit 13, the same effects are obtainable.

Figure 9:
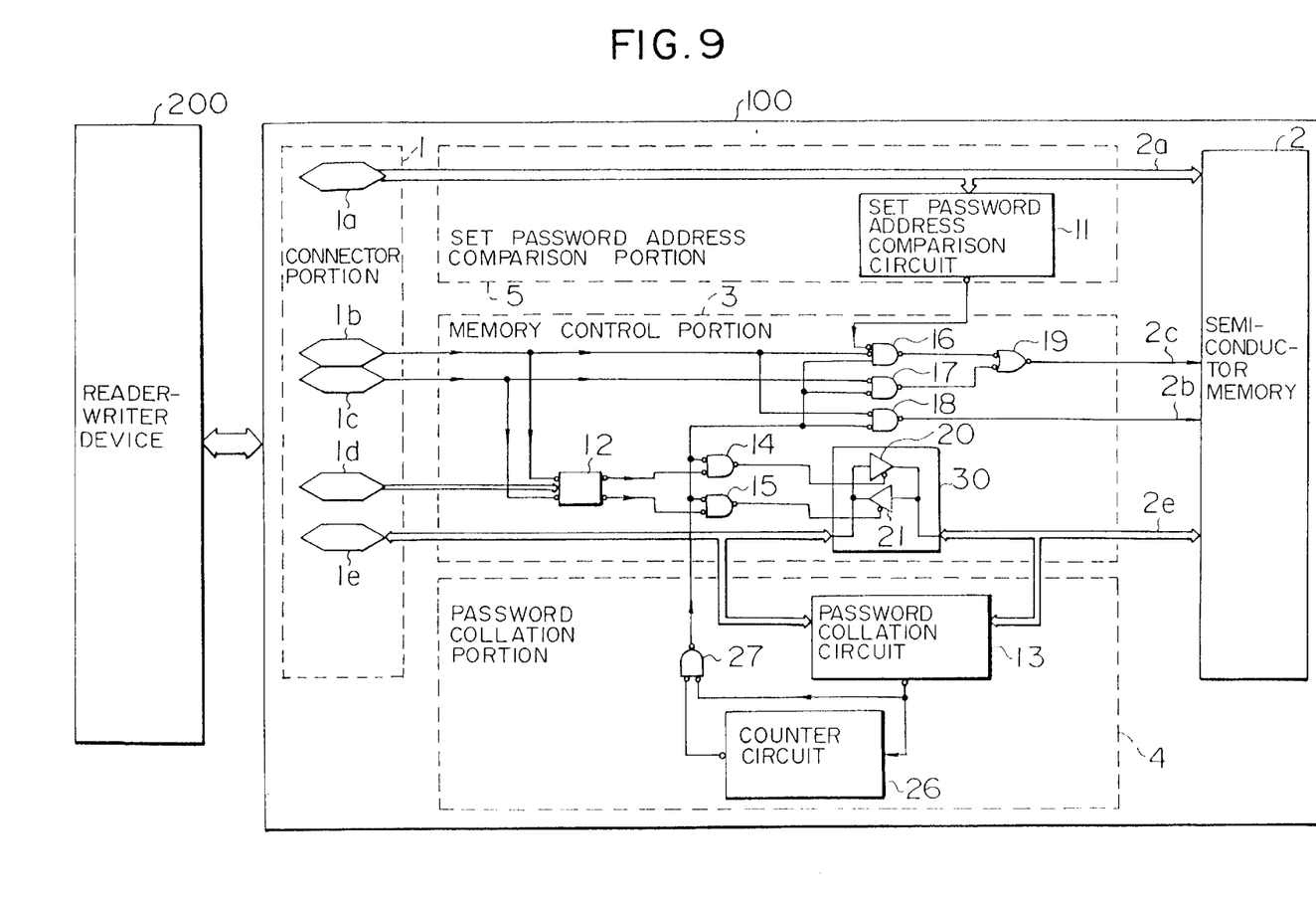
FIG. 9 is a block diagram showing a third embodiment of a memory card.

FIG. 9 shows a third embodiment of the present invention, in which a counter 26 for counting the number of times a collating operation of the password is carried out and a gate 27 are added to the password collation portion 4 in the first embodiment, and, when collating operations are performed a certain number of times or more, the inhibit state is made non-releasable thereafter even if the result of collation shows coincidence. In FIG. 9, the components that are the same as those in FIG. 1 are indicated with the same reference numerals. The counter 26 is structured so that the output thereof shows a Low signal output in the case of a number of collation operations less than a certain number of times and a High signal output in the case of a number of collation operations of a certain number or more.

With this, it is possible to prevent an act that a person who does not know the password learns a correct password by trying input of the password several times and reads or writes the data of the memory card illegally.

Besides, it is also possible to add the counter circuit 26 and the gate 27 in the present embodiment to the second embodiment described previously.

Figure 10:
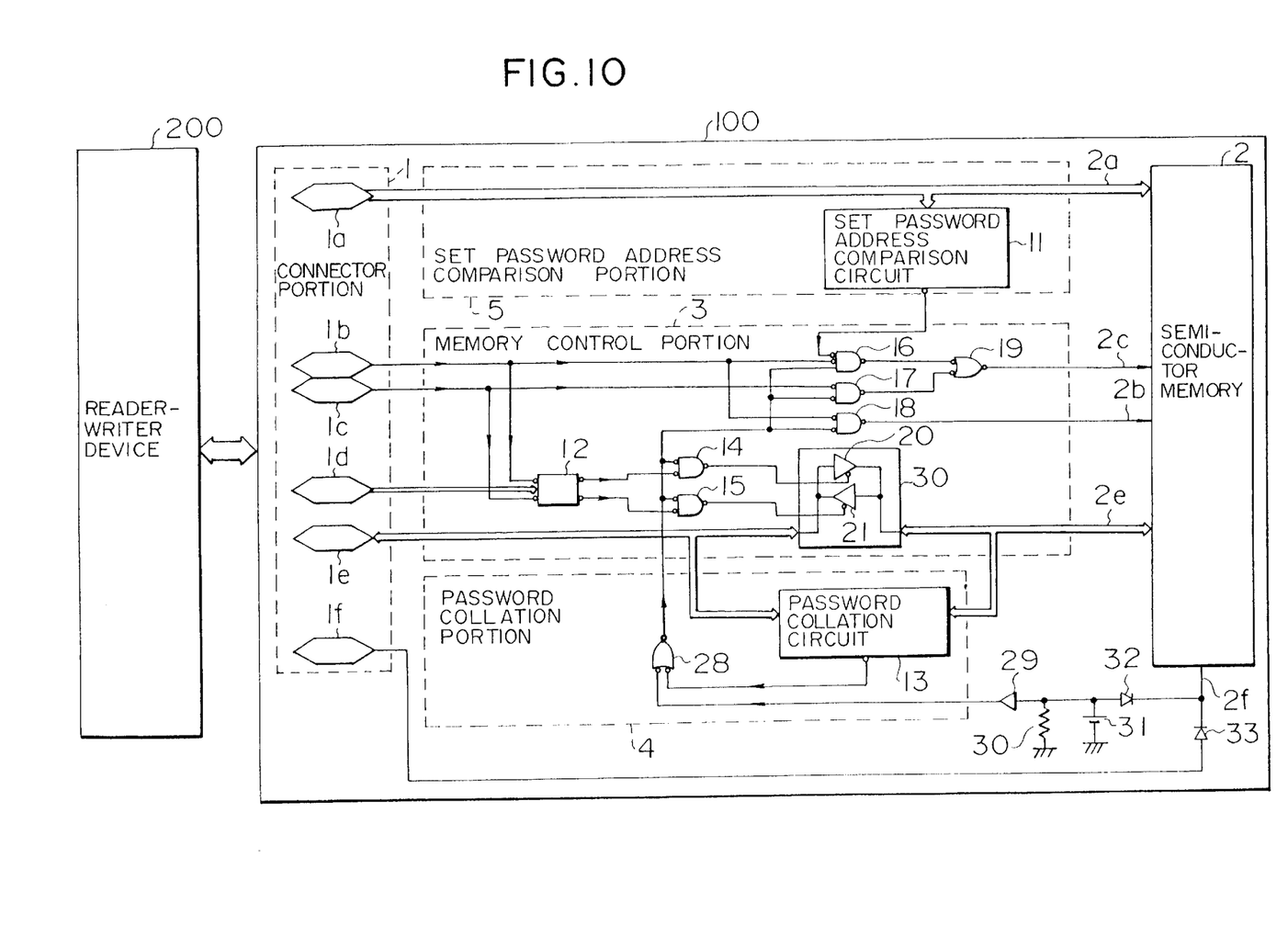
FIG. 10 is a block diagram showing a fourth embodiment of a semiconductor storage device.

FIG. 10 shows a fourth embodiment of the present invention, in which a volatile memory requiring backup by a battery is used for the semiconductor memory 2, and shows a circuit diagram of a memory card in which the data contents of the volatile memory are erased by removing the battery, but the inhibit state of write or read-out of the semiconductor memory 2 can be released at the same time. In FIG. 10, the components same as those shown in FIG. 1 are indicated with the same reference numerals.

Here, a power supply terminal 1f of the connector portion 1 is connected to a power supply terminal 2f of the semiconductor memory 2 through a diode 33. A battery 31 is also connected to this terminal 2f through a diode. The battery 31 is connected further to a gate 28 with the output of the password collation circuit 13 as the input through a gate 29, and the output of the gate 28 is supplied to the gates 14 to 18.

When the battery 31 is removed, the output of the gate 29 turns from a High signal into a Low signal. The output of the gate 28 that has received the output of the gate 29 becomes a Low signal, thus releasing the inhibit state. With this, when a password is forgotten, the contents of the volatile semiconductor memory are erased by removing the battery, but the write and read inhibit state is released with the above. Hence, the memory card itself can be used again. Since the contents of the volatile semiconductor memory vanish, it will never occur that the contents of this volatile semiconductor memory are known to others.

The diode 32 operates to switch the battery 31 over to the power supply supplied from the power supply terminal 1f of the connector 1. With this, either of voltages is supplied to the power supply terminal 2f of the semiconductor memory 2. Further, the diode 33 prevents the current of the battery 31 from flowing backward to the power supply terminal 1f of the connector portion 1. A resistance 30 turns the input of the gate 29 into a Low signal when the battery 31 is removed.

Besides, it is also possible to execute a more functional memory card by adding a structure for switching over the mode by the selected information as in the second embodiment and a structure in which a counter circuit for recording error recovery as in the third embodiment.

The set password has been inputted by utilizing the write control signal input terminal 1b in the above-mentioned embodiments, but, if signal lines have a margin, the same effects are also obtainable when a set password input signal terminal 1g (not illustrated) is provided in the connector portion 1 separately from the write control signal input terminal 1b and the set password is inputted through this terminal.

Figure 11:
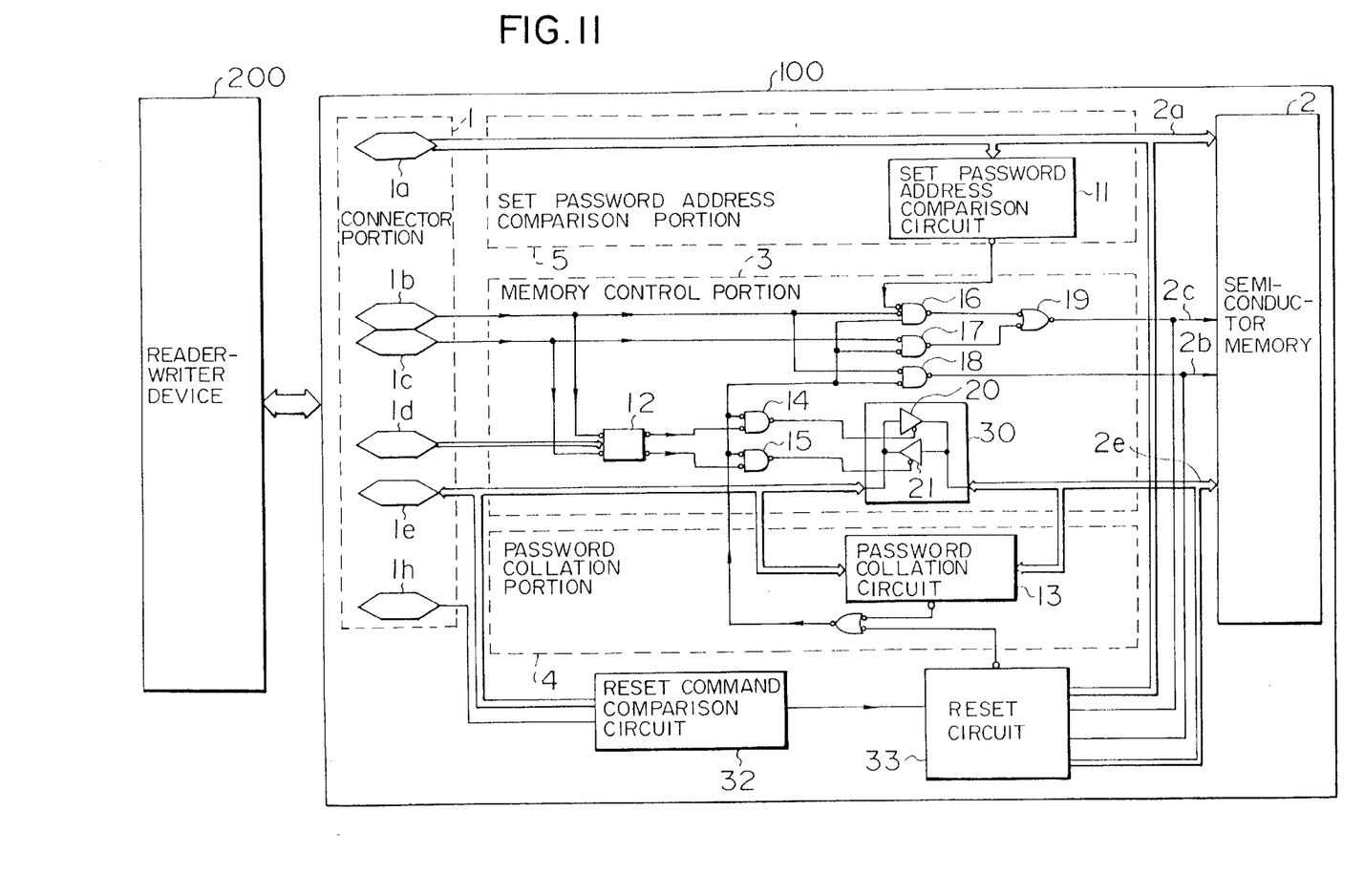
FIG. 11 is a block diagram showing a fifth embodiment of a semiconductor storage device.

FIG. 11 shows a fifth embodiment of the present invention, in which a data readable and writable nonvolatile memory is used for the memory 2. Besides, in FIG. 11, the components that are the same as those in the first embodiment are indicated with the same reference numerals.

What is different from the first embodiment and the present embodiment is that a flash memory is used for the semiconductor memory 2 and that a reset command comparison circuit 32 and a reset circuit 33 are provided.

The reset command comparison circuit 32 determines whether a command inputted from the reader-writer device 200 is a reset command or not, and outputs a coincidence signal in the case of coincidence, and is connected to a terminal 1e for exchanging a data signal and the reset circuit 33.

The reset circuit 33 erases the contents of the data storage region 202 and the set password storage region 201 of the semiconductor memory 2 in accordance with the coincidence signal of the reset command comparison circuit 32, and is composed of a CPU and a memory in which a reset flow is stored. The reset circuit is connected to an address signal terminal 2a, a data signal terminal 2e, a write control signal line 2b, a read control signal line 2c and a password collation portion 4.

Figure 12:
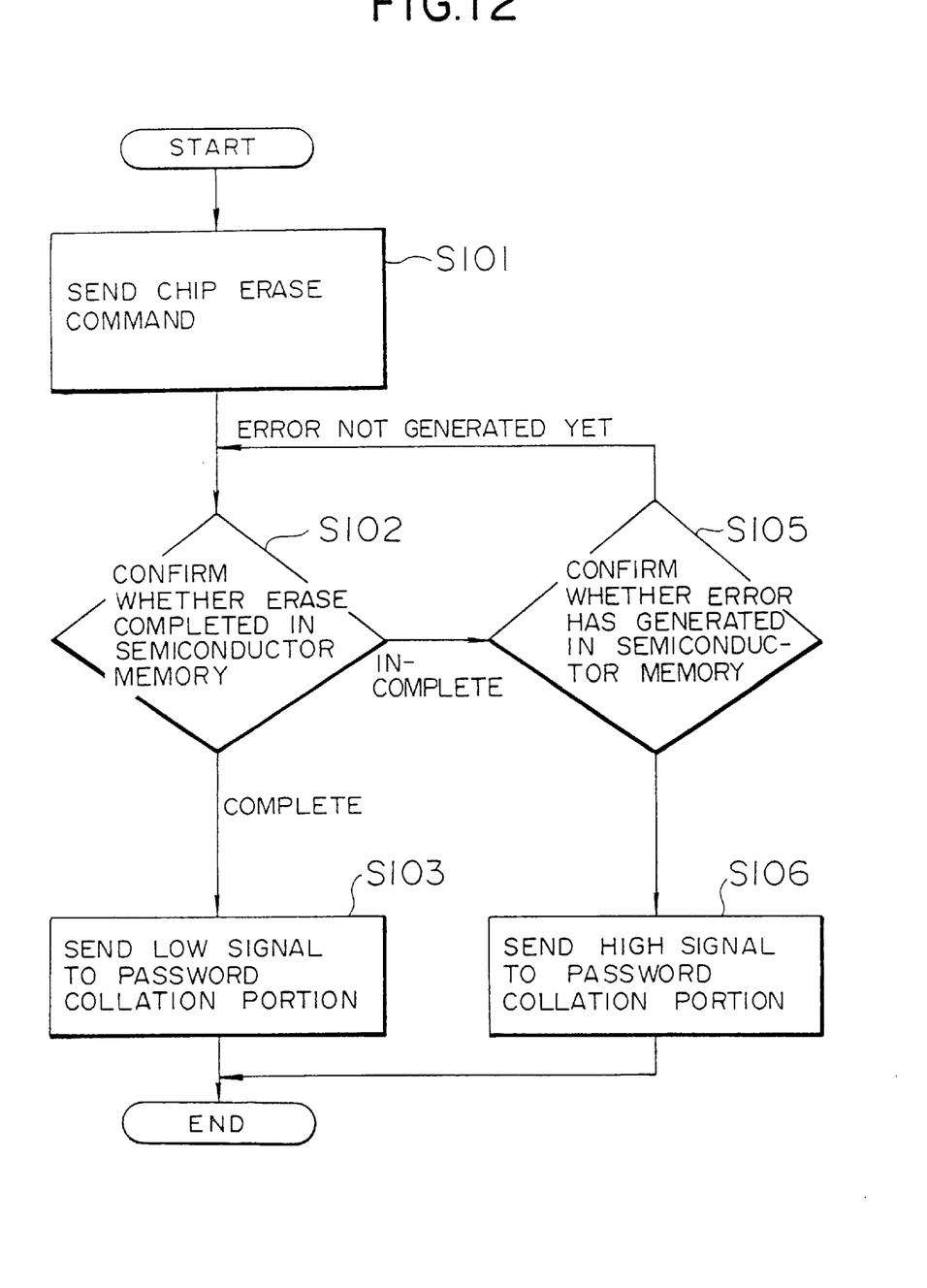
FIG. 12 is a flow chart showing a processing procedure of the embodiment shown in FIG. 11.

Next, the operation of the present embodiment will be described with reference to FIG. 11 and FIG. 12.

First, when an operation of writing a reset command into the semiconductor memory 2 is indicated from the reader-writer device 200, the reset command comparison circuit 32 determines whether the data from a data I/O terminal 1e are the reset command or not. When the input data are determined to be the reset command in the reset command comparison circuit 32, a coincidence signal is sent to the reset circuit 33. When the reset circuit 33 receives a coincidence signal from the reset command comparison circuit 32, the CPU inside thereof operates in accordance with a flow shown in FIG. 12. Besides, the reset circuit 33 normally outputs a High signal to the password collation portion 4.

First, the reset circuit 33 sends a chip erase command to the flash memory 2 (S101). With this, erase processing of a password and data is started inside the flash memory 2. Then, it is determined whether the erase processing has been completed or not by monitoring a state signal from the memory (S102). When it is determined that the processing has not been completed, it is determined whether an error has been generated during erase processing of the flash memory (S105), and the process is returned to S102 when it is determined that no error has been generated, and monitoring is continued.

When it is determined in S102 that erase processing has been completed, a Low signal is outputted to the password collation portion 4 (S103), and processing is terminated. With this, the write-read inhibit state is released forcibly.

On the other hand, when it is determined in S105 that an error has been generated, a High signal is continued to be outputted to the password collation portion 4, and the read-write inhibit state is continued.

As described above, the present embodiment is structured so that the read-write inhibit state is released forcibly by erasing the whole of the flash memory 2. Therefore, the use of a card can be revived upon erasing the storage data even when a card owner forgets the password.

Although embodiments of the present invention applied to a card have been described above, the present invention is not limited thereto, but it is a matter of course that it is generally applicable to what is called a semiconductor device such as a semiconductor disk.

According to the embodiments described above, it is possible to realize protection of write and read of data using a password by a simple, compact and inexpensive circuit means, thereby to provide a semiconductor storage device that has a large storage capacity and is compact in size that makes it possible to maintain secrecy of storage data and to prevent destruction or the like of storage data at a low price.

We claim:

1. An IC memory card comprising:

a semiconductor memory for storing various data;

a connector for coupling with a reader-writer device;

memory control means for controlling reading of data from said semiconductor memory and writing of data into said semiconductor memory in accordance with instructions from said reader-writer device inputted through said connector, said semiconductor memory having a set password storage region in which set passwords have been written;

set password address comparison means for outputting a coincidence signal to said memory control means when an address signal inputted from said connector represents an address of the set password storage region; and password collation means for outputting a coincidence signal to said memory control means when a set password outputted from said memory control means and an input password inputted from said connector coincide with each other, said memory control means reading the set password out of the set password storage region of said semiconductor memory and outputting the set password to said password collation means when the coincidence signal from said set password address comparison means is received, and inhibiting access to said semiconductor memory until the coincidence signal from said password collation means is received, said semiconductor memory writing data upon receipt of a write control signal from said connector and reading data upon receipt of a read control signal, said memory control means converting the write control signal from said connector into a read control signal when a coincidence signal is provided from said set password address comparison means, reading a set password out of the set password storage region of said semiconductor memory and outputting the set password to said password collation means.

2. The IC memory card according to claim 1, wherein alternation and reading of a set password that has been written in said semiconductor memory is enabled after a state of inhibited access of said semiconductor memory is released depending on a result of the set password collation by said password collation means.

3. The IC memory card according to claim 1, wherein said password collation means comprises:

counter means for counting a number of collating times, and when the collating operation is performed a certain number of times or more, the coincidence signal is not outputted to said memory control means thereafter even when the set password and the input password coincide with each other.

4. The IC memory card according to claim 1, wherein a part of or all of said semiconductor memory is a volatile memory backed up with a battery, data contents of the volatile memory vanish and an access inhibit state of said semiconductor memory is released upon removal of the battery.

5. The IC memory card according to claim 1, wherein said semiconductor memory is a flash memory, the IC memory card further comprising:

reset command comparison means for outputting a coincidence signal when a command inputted from said reader-writer device coincides with a predetermined reset command; and reset means for resetting storage contents of said semiconductor memory upon output of the coincidence signal from said reset command comparison means.

6. The IC memory card according to claim 1, wherein said semiconductor memory has a selected information storage region where selected information indicative of operation of the IC memory card in either one of a standard mode and a password collation mode is written, the IC memory card further comprising:

selected information address comparison means for outputting a coincidence signal to said memory control means when an address signal inputted from said connector represents an address of the selected information storage region, said memory control means referring to the selected information when the coincidence signal from said selected information address comparison means is received and releasing inhibition of access to said semiconductor memory if the selected information is indicative of the standard mode.

7. The IC memory card according to claim 6, wherein the selected information storage region is provided at address '0(H)' of said semiconductor memory, and if invalid data is stored at the address '0(H)', the selected information storage region is provided at an address next to the invalid data.

8. The IC memory card according to claim 7, wherein contents of the selected information storage region of said semiconductor memory are expressed using one byte such that in the standard mode, any of data '00(H)', data '01(H)' and data 'FF(H)' is stored in the selected information storage region and in the password collation mode, any data other than data '00(H)', data '01(H)' and data 'FF(H)' is stored in the selected information storage region.

* * * * *